(12) United States Patent
Hecht

(10) Patent No.: US 7,217,070 B2
(45) Date of Patent: May 15, 2007

(54) DEBURRING TOOL AND CUTTING INSERT THEREFOR

(75) Inventor: Gil Hecht, Nahariya (IL)

(73) Assignee: Iscar Ltd., Tefen (IL)

( * ) Notice: Subject to any disclaimer, the term of this patent is extended or adjusted under 35 U.S.C. 154(b) by 448 days.

(21) Appl. No.: 10/932,035

(22) Filed: Sep. 2, 2004

(65) Prior Publication Data

US 2005/0084353 A1    Apr. 21, 2005

(30) Foreign Application Priority Data

Oct. 20, 2003    (IL) .................................. 158497

(51) Int. Cl.
    *B23B 51/08*     (2006.01)
    *B23B 31/10*     (2006.01)

(52) U.S. Cl. .................. 408/154; 408/224; 407/113

(58) Field of Classification Search ............... 408/153, 408/224, 155, 232, 233, 156, 188, 211, 231, 408/154, 714; 407/113
See application file for complete search history.

(56) References Cited

U.S. PATENT DOCUMENTS

| | | | |
|---|---|---|---|
| 3,940,214 A | | 2/1976 | Waschek |
| 5,607,263 A | * | 3/1997 | Nespeta et al. ............... 407/61 |
| 5,755,538 A | | 5/1998 | Heule |
| 5,810,518 A | * | 9/1998 | Wiman et al. ............... 407/102 |
| 5,827,016 A | * | 10/1998 | Strand .......................... 407/115 |
| 5,924,826 A | * | 7/1999 | Bystrom et al. ............. 407/103 |
| 5,931,613 A | * | 8/1999 | Larsson ....................... 407/103 |
| 5,944,456 A | | 8/1999 | Shirley et al. |
| 6,039,515 A | * | 3/2000 | Lamberg ..................... 408/188 |
| 6,116,824 A | * | 9/2000 | Strand et al. ................. 407/40 |
| 6,146,061 A | * | 11/2000 | Larsson ....................... 407/103 |
| 6,158,928 A | * | 12/2000 | Hecht ......................... 407/102 |
| 6,254,316 B1 | * | 7/2001 | Strand ......................... 407/113 |
| 6,575,670 B2 | * | 6/2003 | Men ............................. 407/42 |
| 6,604,893 B2 | * | 8/2003 | Nelson ......................... 407/35 |
| 6,607,335 B2 | * | 8/2003 | Morgulis ..................... 407/40 |
| 6,742,971 B2 | * | 6/2004 | Tong ............................ 407/117 |
| 6,869,257 B2 | * | 3/2005 | Wiles ........................... 408/54 |
| 7,011,477 B2 | * | 3/2006 | Hecht .......................... 408/181 |
| 7,037,051 B2 | * | 5/2006 | Wermeister ................. 407/113 |
| 7,063,487 B2 | * | 6/2006 | Hessman et al. ............. 407/11 |
| 7,121,771 B2 | * | 10/2006 | Englund ..................... 407/103 |
| 2002/0131832 A1 | | 9/2002 | Morsch |

FOREIGN PATENT DOCUMENTS

DE          3446455 A1 *    6/1986

(Continued)

*Primary Examiner*—Monica Carter
*Assistant Examiner*—Michael W. Talbot
(74) *Attorney, Agent, or Firm*—Womble Carlyle

(57) ABSTRACT

A deburring tool having an indexable cutting insert having four cutting edges. The cutting insert has a main body portion and a protruding guide member. The cutting insert is slidably retained in an insert pocket with the main body portion of the insert located in a generally rectangular slot portion of the insert pocket and with the guide member located and engaging a guide groove portion of the insert pocket. The cutting insert is moveable between a retracted position and an extended position by means of a spring which biases the cutting insert towards the extended position. The sliding movement of the cutting insert is performed by the sliding of the guide member within the guide groove.

32 Claims, 7 Drawing Sheets

FOREIGN PATENT DOCUMENTS

| | | | |
|---|---|---|---|
| DE | 3816301 A1 | * | 12/1988 |
| DE | 1004035707 A1 | * | 3/2006 |
| EP | 65149 A2 | * | 11/1982 |
| JP | 06190608 A | * | 7/1994 |
| JP | 08141806 A | * | 6/1996 |
| JP | 2000052111 A | * | 2/2000 |

* cited by examiner

DEBURRING TOOL AND CUTTING INSERT THEREFOR

FIELD OF THE INVENTION

The present invention relates to a tool comprising a spring-loaded cutting insert for the deburring of bores.

BACKGROUND OF THE INVENTION

An example of such a deburring tool is disclosed in U.S. Pat., No. 5,755,538 in accordance with which a cutting insert with a cutting portion, loaded by a spring engaged in a rear groove of the insert, is held in a radially, outwardly sealed window in a tool holder. In the first embodiment, the insert is guided slidable in the tool holder and can, accordingly, be moved in or out by a radial sliding or swinging out of the window of the tool holder. The insert is designed with a lateral groove which is located perpendicular to its longitudinal axis. In the area of this groove, a tension pin is engaged perpendicular to the cutting portion-longitudinal axis and flush in the tool holder and is fixed by the size of the groove in the insert-sliding direction of the insert-sliding path in the window-sliding direction. The insert has only one cutting portion comprising two cutting edges. One cutting edge being operative in the forward direction and the other in the reverse direction.

SUMMARY OF THE INVENTION

In accordance with the present invention there is provided an indexable cutting insert, comprising:

a top surface, a bottom surface and peripheral surface therebetween; and two identical opposing cutting portions, each cutting portion comprising two identical cutting edges, each cutting edge being located between a rake surface and a relief surface, the two cutting portions being reflection symmetric with respect to a major median plane of the cutting insert, the two identical cutting edges of each cutting portion being reflection symmetric with respect to a minor median plane P2 of the cutting insert;

the bottom surface comprising two bottom surface sections and a single guide member therebetween, the guide member comprising at least one ridge protruding beyond the bottom surface sections in a direction away from the top surface, the guide member having a longitudinal axis directed perpendicular to the major median plane.

If desired, the cutting insert is provided with a through hole, passing between the top and bottom surfaces, the through hole dividing the guide member into two guide member portions, located on either side of the major median plane In accordance with the present invention, the rake surface is located in the top surface and the relief surface is located in the peripheral surface of the cutting insert.

Preferably, the two bottom surface sections are flat and coplanar.

Further if desired, the cutting insert is provided with a recess in the top surface.

Preferably, the cutting insert is octagonally shaped in a top view of the cutting insert.

There is also provided in accordance with the present invention, a deburring tool comprising:

at one least cutting insert in accordance with the present invention; and a tool body having at least one insert pocket in which the at least one cutting insert is slidably retained, the at least one insert pocket opening out to a peripheral surface of the tool body via an aperture, the at least one insert pocket comprising a slot and a guide groove with the guide member engaging the guide groove and the cutting insert located at least partially in the slot;

the cutting insert being slidable between a retracted position and an extended position by means of a spring which biases the cutting insert towards the extended position, wherein in the extended position a given cutting portion protrudes from the aperture beyond the peripheral surface.

In accordance with the present invention, the spring is a compression spring.

Typically, the cutting insert is held in the extended position by a holding member.

Preferably, in the extended position the holding member abuts a holding surface of the cutting insert.

If desired, the holding surface is a portion of a hole-surface of an insert through hole formed in the cutting insert.

Further if desired, the holding surface is a portion of a recess in the top surface.

In accordance with one application of the present invention, the tool body of the deburring tool comprises a shank portion of a drill.

In another aspect, the present invention is directed to an indexable cutting insert comprising a top surface, a bottom surface and a peripheral surface therebetween. The peripheral surface comprises two opposing end surfaces and two opposing side surfaces. The bottom surface comprises two bottom surface sections and a single, centrally located guide member therebetween, the guide member protruding from the bottom surface sections in a direction away from the top surface, the guide member having a longitudinal axis that intersects the two opposing end surfaces, in a bottom view of the cutting insert. The cutting insert also includes a first cutting portion comprising two identical cutting edges, one on either side of a first of said end surfaces; and a second cutting portion comprising two identical cutting edges, one on either side of a second of said end surfaces.

BRIEF DESCRIPTION OF THE DRAWINGS

For a better understanding, the invention will now be described, by way of example only, with reference to the accompanying drawings in which.

DETAILED DESCRIPTION OF THE INVENTION

Figure 1:
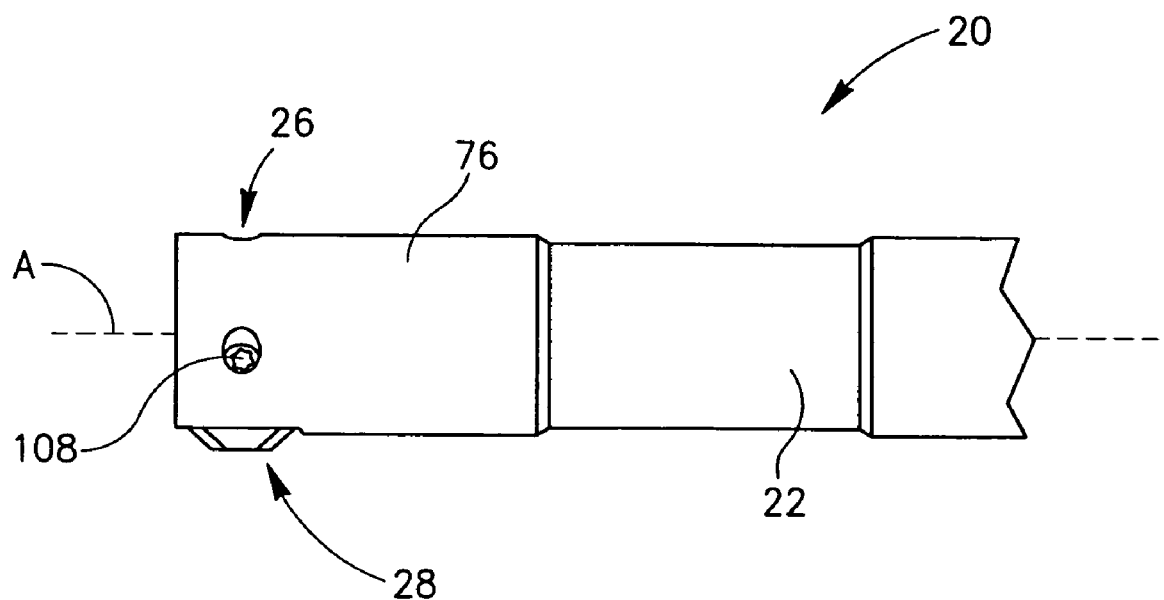
FIG. 1 is a side view of a deburring tool in accordance with the present invention.
Figure 2:
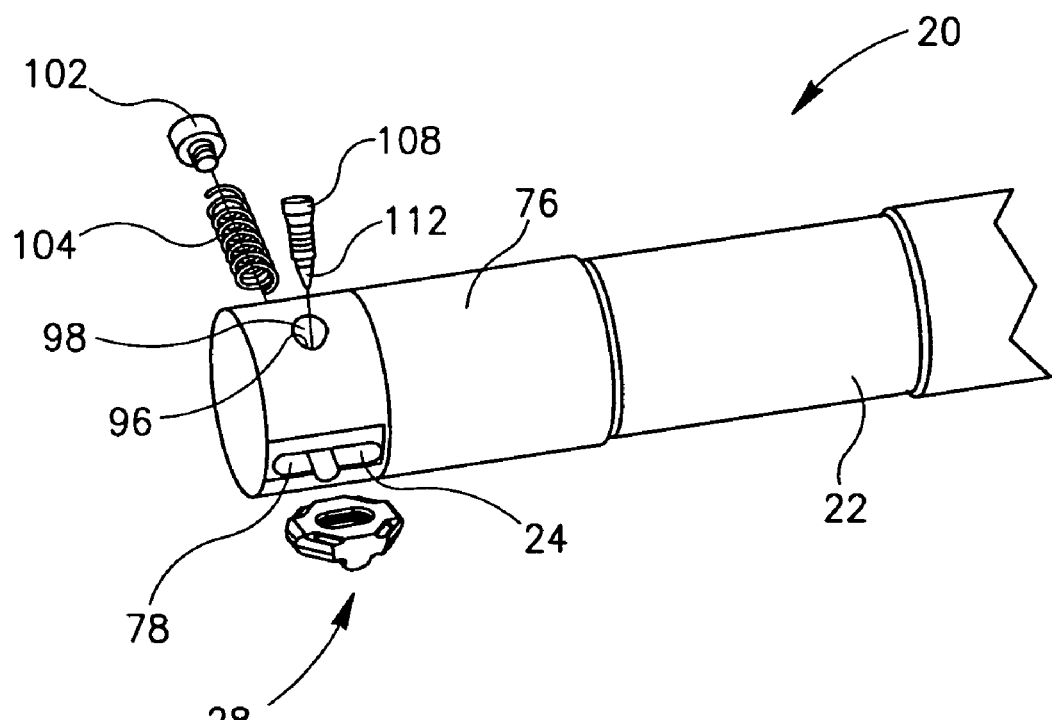
FIG. 2 is an exploded perspective view of the deburring tool shown in FIG. 1.
Figure 3:
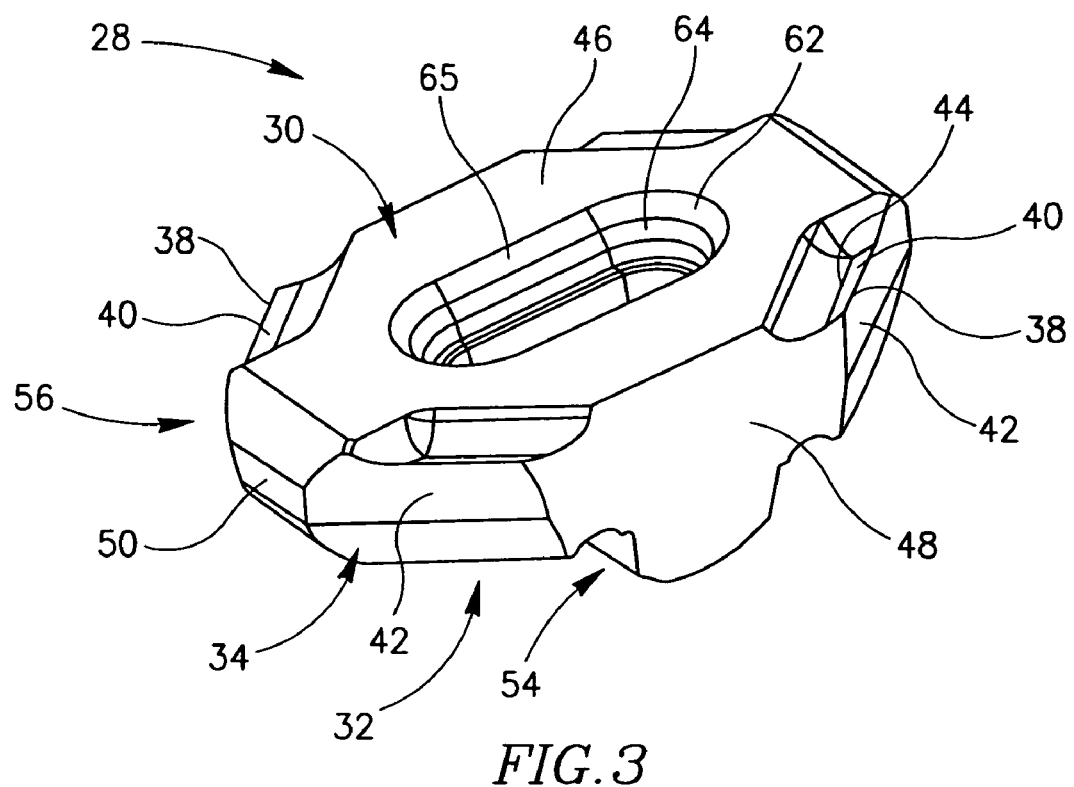
FIG. 3 is top perspective view of one embodiment of a cutting insert in accordance with the present invention.
Figure 4:
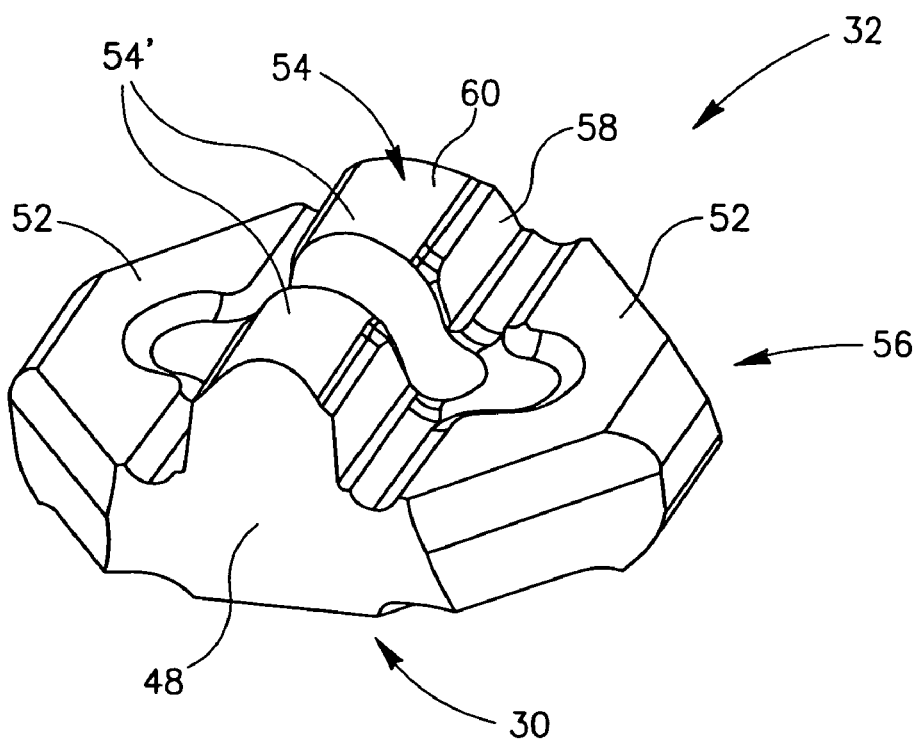
FIG. 4 is bottom perspective view of the cutting insert shown in FIG. 3.
Figure 5:
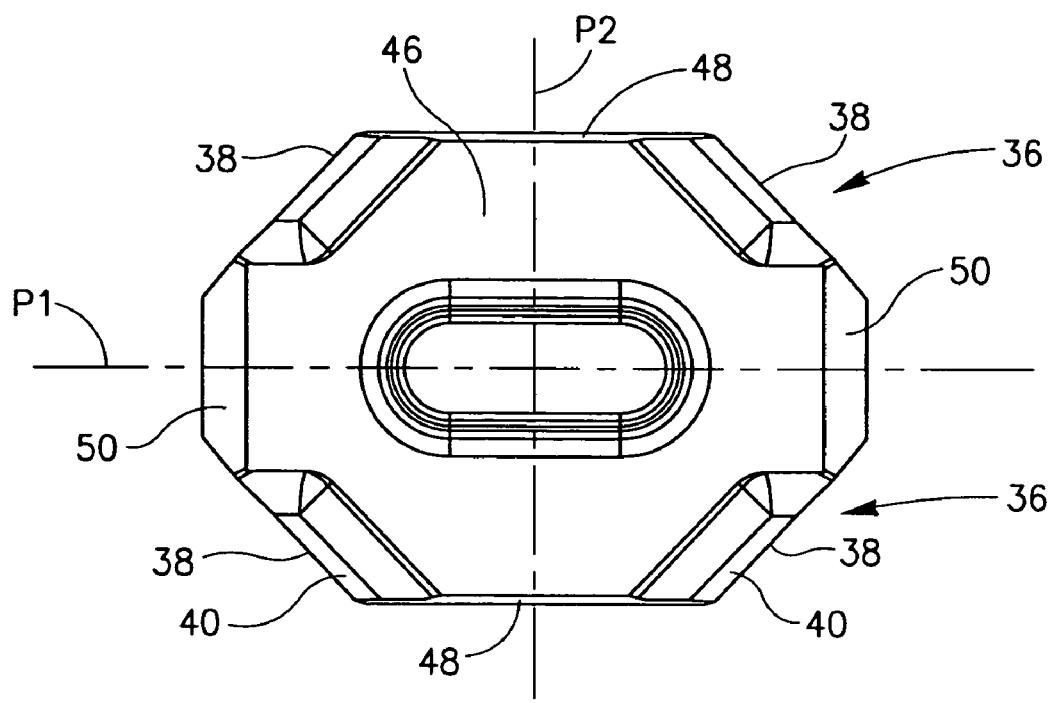
FIG. 5 is top view of the cutting insert shown in FIG. 3.

Attention is first drawn to FIGS. 1 and 2, showing a deburring tool 20 in accordance with the present invention. The deburring tool 20 has a longitudinal axis of rotation A, defining a forward to rear direction, and comprises a generally cylindrical tool body 22 having an insert pocket 24 at the forward end 26 of the tool body 22 in which an indexable cutting insert 28 is slidably retained. The cutting insert 28 is shown in greater detail in FIGS. 3 to 6 and comprises a top surface 30, a bottom surface 32 and peripheral surface 34 extending between the top and bottom surfaces 30, 32. It should be noted that directional terms appearing throughout the specification and claims, e.g. "top", "bottom", "upper", "lower", etc., are used as terms of convenience to distinguish various surfaces relative to each other. Although these terms may be meaningful with reference to particular component orientations, they are used for illustrative purposes only, and are not intended to limit the scope of the appended claims. The cutting insert 28 is octagonally shaped in top and bottom views and has two identical opposing cutting portions 36, each cutting portion 36 comprising two identical cutting edges 38, each cutting edge 38 being located between a rake surface 40 and a relief surface 42. Therefore, the cutting insert 28 has a total of four cutting edges 38, all associated with the top surface 30 of the cutting insert 28. Each relief surface 42 is located in the peripheral surface 34 and each rake surface 40 is located in the top surface 30 and forms part of a chip groove 44 in the top surface 30. Each chip groove 44 merges with a major top surface section 46 of the top surface 30. The major top surface section 46 is typically flat. The two cutting portions 36 are reflection symmetric with respect to a major median plane P1 of the cutting insert 28, and the two identical cutting edges 38 of each cutting portion 36 are reflection symmetric about a minor median plane P2 of the cutting insert 28.

The peripheral surface 34 comprises two opposing end surfaces 48 that are reflection symmetric about the major median plane P1, each end surface 48 belonging to a given cutting portion 36, and two opposing side surfaces 50 that are reflection symmetric about the minor median plane P2, the side surfaces 50 being located between the cutting portions 36.

Figure 6:
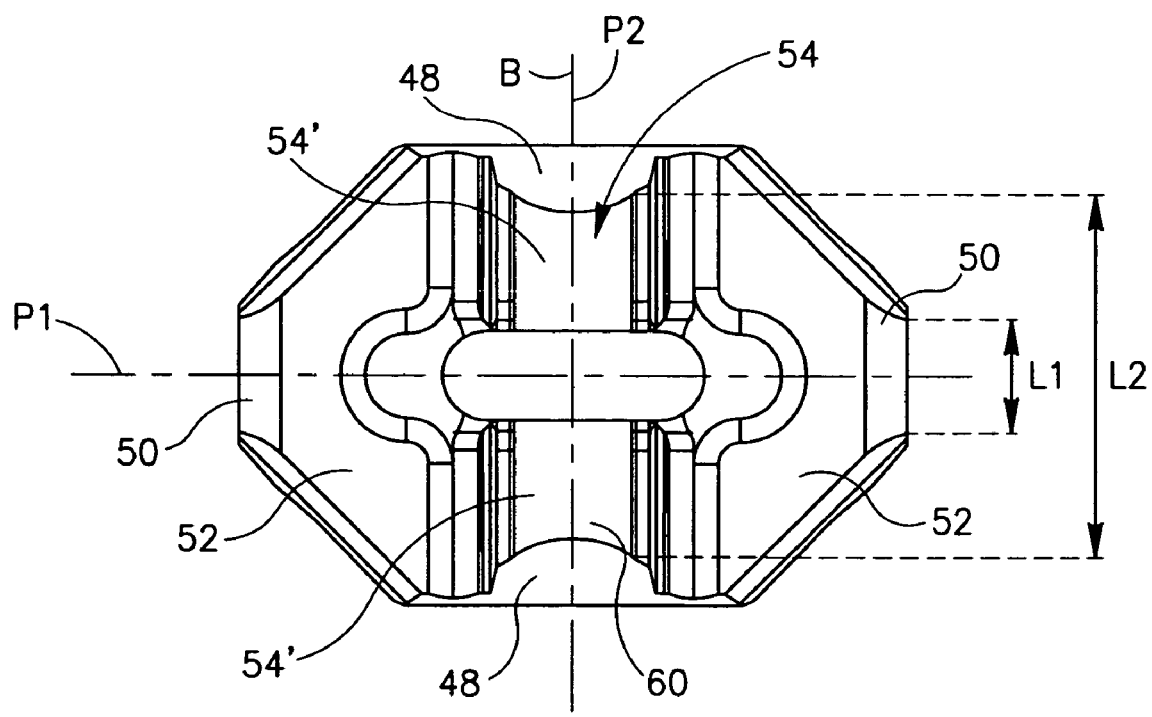
FIG. 6 is bottom view of the cutting insert shown in FIG. 3.

The bottom surface 32 of the cutting insert 28 comprises two bottom surface sections 52 and a centrally located guide member 54 therebetween. The two bottom surface sections 52 are typically flat and coplanar and parallel to the major top surface section 46 and are located on either side of the minor median plane P2. The guide member 54 protrudes outwardly forming a ridge, protruding beyond the bottom surface sections 52 in a direction away from the major top surface section 46 and runs parallel to the minor median plane P2 and has a longitudinal axis B lying in the minor median plane P2. As seen in FIG. 6, the longitudinal axis B intersects the opposing end surfaces 48, in a bottom view of the cutting insert.

The minor median plane P2 constitutes a longitudinal median plane of the guide member 54, dividing it longitudinally. Therefore, the cutting insert 28 comprises a main body portion 56 having a protruding guide member 54. The guide member 54 comprises opposing flat abutment surfaces 58 located on either side of the minor median plane P2, extending outwardly away from the bottom surface sections 52 and merging with a longitudinally extending convex surface 60 that bridges between the abutment surfaces 58. For later discussion, it is noted that (see FIG. 6) each side surface 50 has a first length, L1, and the guide member 54 has a second length, L2; each length being measured in the direction of the longitudinal axis B of the guide member 54, the first length, L1, being smaller than the second length, L2.

Figure 7:
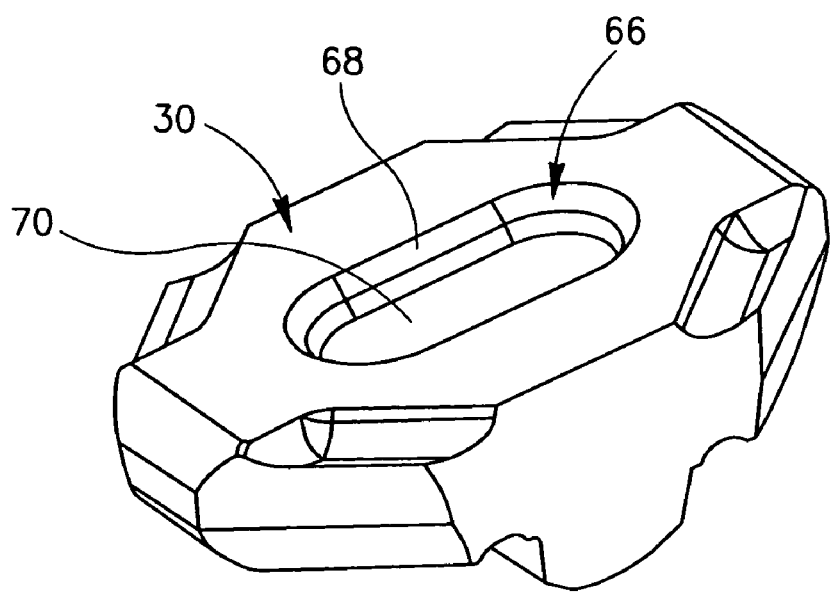
FIG. 7 is top perspective view of an alternative embodiment of a cutting insert in accordance with the present invention.
Figure 8:
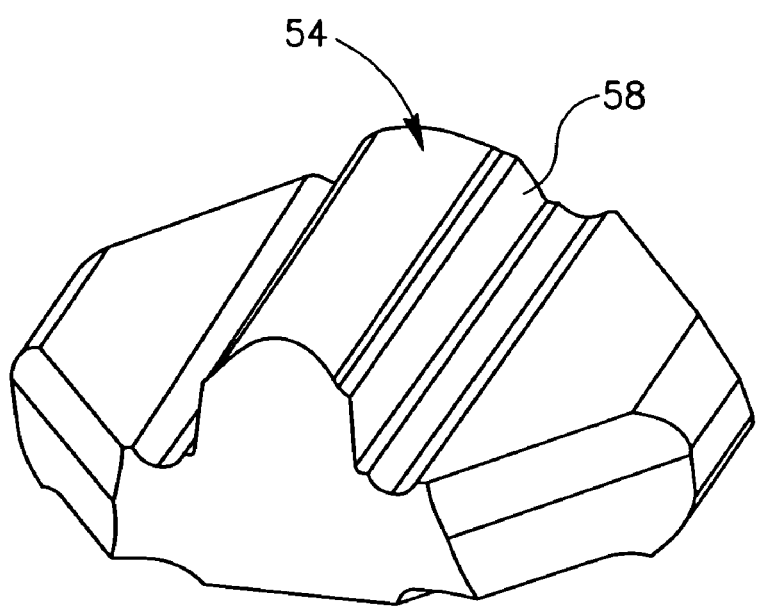
FIG. 8 is bottom perspective view of the cutting insert shown in FIG. 7.

An insert through hole 62, passing between the top and bottom surfaces 30, 32 divides the guide member 54 into two guide member portions 54', that is, divides the ridge into two ridges, located on either side of the major median plane P1. The insert through hole 62 has a hole-surface 64 forming a holding surface 65 of the cutting insert 28. In an alternative embodiment, shown in FIGS. 7 and 8, instead of a through hole 62, the cutting insert 28 is provided with a recess 66 in the top surface 30. The recess 66 comprises a recess side surface 68 extending inwardly from the top surface 30 of the cutting insert 28 to a bottom surface 70 of the recess 66. In this embodiment, the recess side surface 68 forms the holding surface 65. As can be seen in FIG. 8, in this embodiment, the guide member 54 comprises a single uninterrupted ridge.

Figure 9:
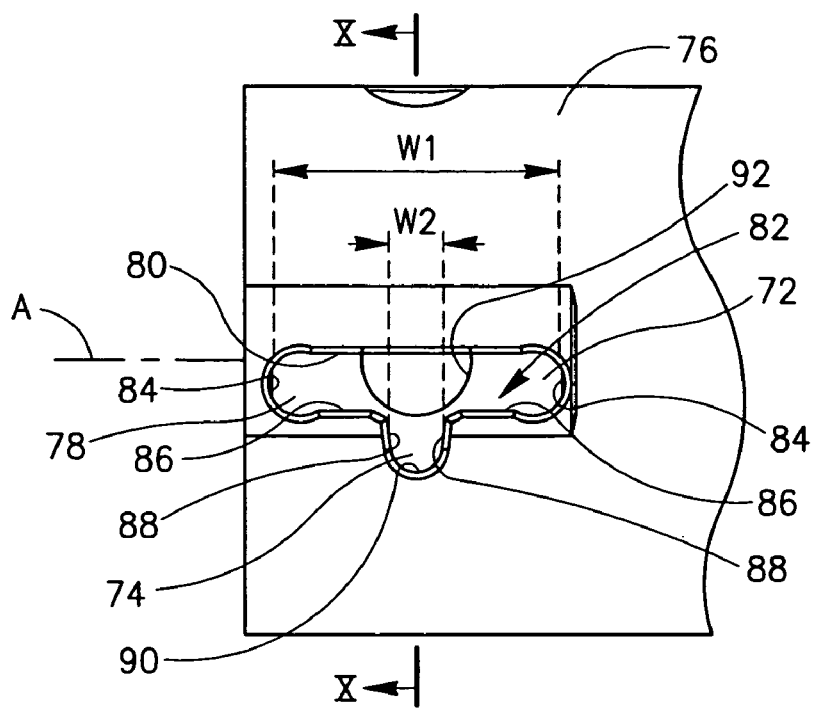
FIG. 9 is a partial side view of the deburring tool shown in FIG. 1 rotated through 90° with the cutting insert removed.
Figure 10:
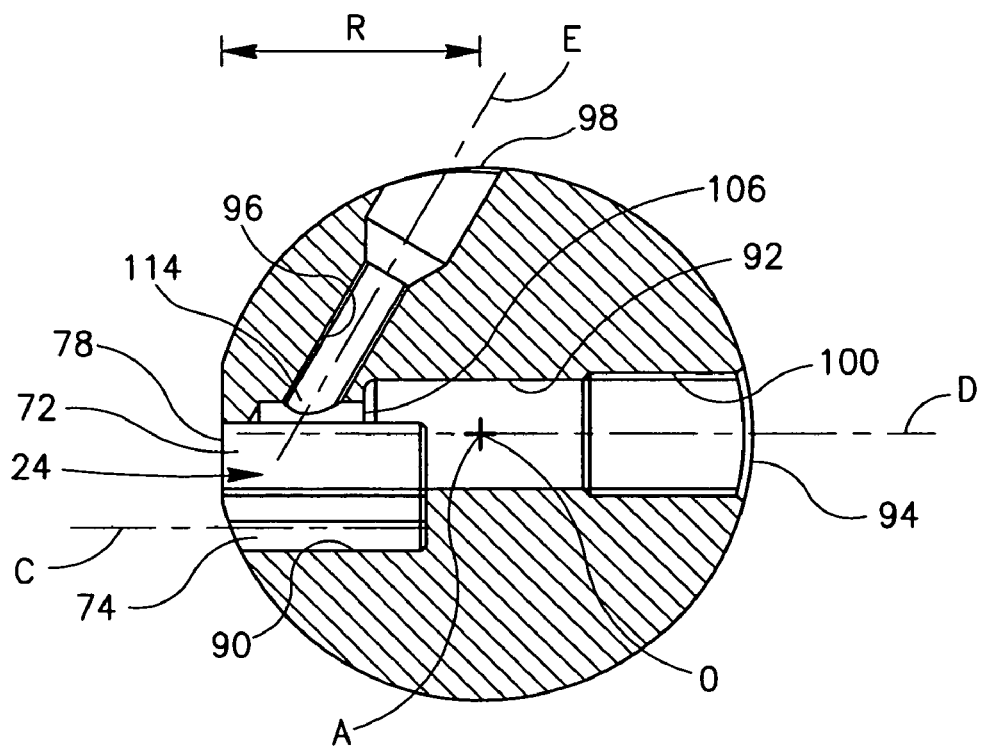
FIG. 10 is a cross-sectional view of the deburring tool shown in FIG. 9 taken along the line X–X.

Attention is now turned to FIGS. 9 and 10. The insert pocket 24 has the general form of a T-shaped slot comprising a generally rectangular slot 72 (the "arms" of the "T") and a guide groove 74 (the "foot" of the "T"). The generally rectangular slot 72 has a first width, W1, and the guide groove 74 has a second width, W2, the two widths being measured in the direction of the longitudinal axis of rotation A of the deburring tool 20; where the first width, W1, is greater than the second width, W2. The insert pocket 24 opens out to a peripheral surface 76 of the tool body 22 via a first aperture 78. The insert pocket 24 extends from the peripheral surface 76 of the tool body 22 inwardly in a generally radial direction relative to the axis of rotation A of the deburring tool 20. In the cross section shown in FIG. 10, the peripheral surface 76 of the tool body 22 is generally circular, having a given radius, R, with the axis of rotation A being located at the origin, O, of the circle. The generally rectangular slot 72 comprises opposing upper and lower walls 80, 82 joined by sidewalls 84. The lower wall 82 comprises two lower wall sections 86 that are parallel to the upper wall 80. The guide groove 74 is located between the two lower wall sections 86 and comprises opposing flat groove support surfaces 88 extending from respective lower wall sections 86 in a direction away from the upper wall 80 and merging with a longitudinally extending concave surface 90 that defines a longitudinal axis C of the guide groove 74 and that bridges between the two groove support surfaces 88. With reference to FIG. 9, the generally rectangular slot 72 has a first width, W1, and the guide groove 74 has a second width, W2; each width being measured in the direction of the rotational axis A of the deburring tool 20, the first width, W1, being greater than the second width, W2.

Two bores communicate with the insert pocket 24. A major bore 92 extends from a second aperture 94 in the peripheral surface 76 of the tool body 22 to the insert pocket 24. The second aperture 94 of the major bore 92 is substantially diametrically opposite the first aperture 78 of the insert pocket 24. The major bore 92 has a longitudinal axis D that is perpendicular to the axis of rotation A of the deburring tool 20. The axis of rotation A of the deburring tool 20 passes through the major bore 92 which communicates with insert pocket 24. A threaded minor bore 96 extends from a third aperture 98 in the peripheral surface 76 of the tool body 22 to the insert pocket 24. The minor bore 96 has a longitudinal axis E that makes an acute angle with the longitudinal axis D of the major bore 92.

Figure 11:
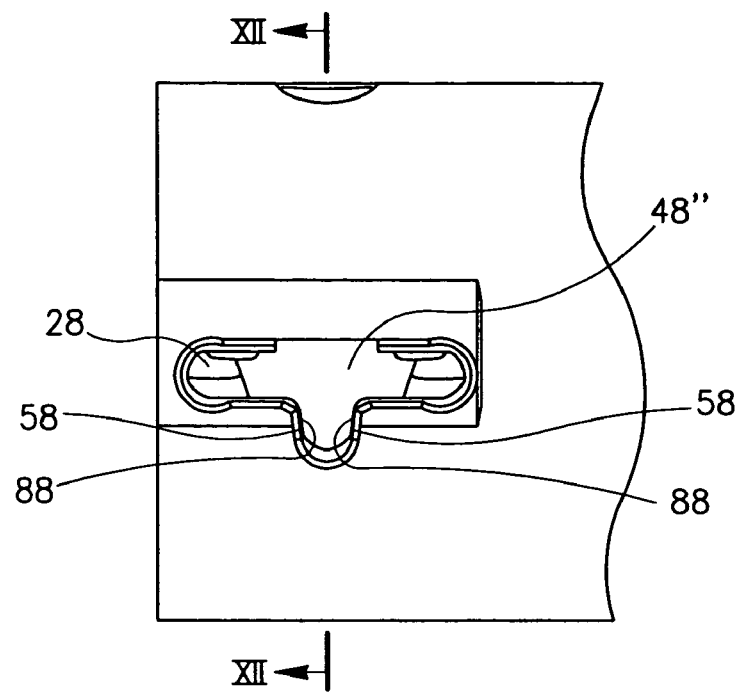
FIG. 11 is the view of the deburring tool shown in FIG. 9 with the cutting insert retained in the insert pocket.
Figure 12:
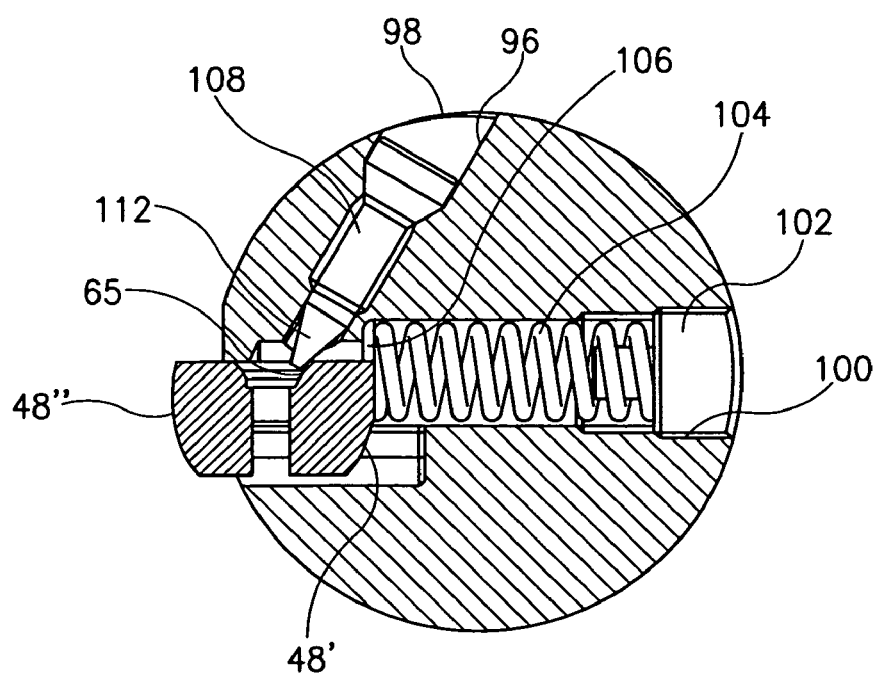
FIG. 12 is a cross-sectional view of the deburring tool shown in FIG. 11 taken along the line XII–XII.

Attention is now turned to FIGS. 11 and 12. The cutting insert 28 is slidably retained in the insert pocket 24 with the guide member 54 engaging the guide groove 74 and the main body portion 56 of the cutting insert 28 located in the generally rectangular slot 72. At the rear end of the major bore 92, in the vicinity of the second aperture 94, the major bore 92 has a threaded portion 100 in which a first screw 102 is threaded. A spring 104, such as a helical compression spring, is located in the major bore 92 between the first screw 102 and the cutting insert 28 for urging the cutting insert 28 radially outwardly through the first aperture 78 at a predetermined pressure. The spring 104 abuts the inner end surface 48' of the cutting insert 28. The inner end surface 48' being the end surface 48 facing inwards into the insert pocket 24, as opposed to the outer end surface 48" that faces outwards in a direction away from the insert pocket 24. The pressure applied by the spring 104 can be adjusted by adjusting the location of the first screw 102, which also acts as a plug to prevent the spring 104 from exiting the major bore 92 through the second aperture 94.

As can be seen in FIG. 10, the major bore 92 and the insert pocket 24 are not fully aligned so that the forward end of the major bore 92, adjacent the insert pocket 24, is partially closed forming a spring retaining surface 106. Therefore, even when the cutting insert 28 is removed from the insert pocket 24, the spring 104 is held in position between the spring retaining surface 106 and the first screw 102. The cutting insert 28 is held in an extended position, as shown in FIG. 1, with one of the cutting portions 36 protruding from the first aperture 78, by means of a holding member 108 which prevents the cutting insert 28 from being completely pushed out of the insert pocket 24 by the spring 104. In the embodiment shown, the holding member 108 is a second screw threaded in the minor bore 96.

To retain the cutting insert 28 in the extended position, the second screw 108 is set in a first position with its forward end protruding beyond the forward end 114 of the minor bore 96 and located partially within the insert through hole 62 (or within the recess 66, for the cutting insert 28 shown in FIGS. 7 and 8) so that it engages the holding surface 65 of the cutting insert 28. The cutting insert 28 can be urged radially inwardly into the insert pocket 24 to a retracted position by applying a radially inwardly directed force to the outer end surface 48" of the cutting insert 28. To remove the cutting insert 28 from the insert pocket 24, in order to index or replace it, the second screw 108 is set in a second position by unscrewing it until its forward end 112 is withdrawn from the insert through hole 62 (or the recess 66), thereby enabling the cutting insert 28 to slide freely out of the insert pocket 24. During deburring operations in which the cutting insert 28 slides between the retracted and extended positions, the second screw 108 is maintained in the first position.

In accordance with the present invention, the sliding movement of the cutting insert 28 between the retracted and extended positions is performed mainly by the sliding of the guide member 54 in the guide groove 74. This arrangement has a number of advantages. It enables a compact cutting insert design without compromising free sliding movement of the cutting insert 28. In other words the first length, L1, of the side surfaces 50 of the cutting insert 28 can be made relatively small in relation to the first width, W1, of the generally rectangular slot 72.

If the cutting insert 28 were to comprise only the main body portion 56 without the protruding guide member 54, then the sliding movement of the cutting insert 28 would take place through sliding abutment of the side surfaces 50 of the cutting insert 28 with the sidewalls 84 of the generally rectangular slot 72. In accordance with the present invention, the first length, L1, of the side surfaces 50 of the cutting insert 28 is less than the first width, W1, of the generally rectangular slot 72. In accordance with a non-binding example, the first width, W1, is five to six times greater than the first length, L1. This being the case, the cutting insert 28 can easily get wedged in the generally rectangular slot 72. To avoid wedging, the first length, L1, would have to be larger than the first width, W1. Due to requirement of four cutting edges 38 and due to the constraint of reflection symmetry with respect to the major median plane P1 of the cutting insert 28 (i.e., the cutting insert 28 is a "double ended" cutting insert with a cutting portion 36 at each end, each cutting portion 36 having two cutting edges 38), the cutting insert 28 is constrained to have the octagonal form shown in FIGS. 5 and 6, and any attempt to design the first length, L1, to be larger than the first width, W1, would create an impractically large cutting insert.

By transferring the sliding movement of the cutting insert 28 to the sliding of the guide member 54 within the guide groove 74, the dimensions that determine the possibility of wedging are the second length, L2, of the guide member 54 and the second width, W2, of the guide groove 74. In accordance with a non-binding example, the second length, L2, is about three times greater than the second width, W2. Choosing the second length, L2, to be greater than the second width, W2, prevents wedging of the guide member 54 in the guide groove 74 and therefore prevents wedging of the cutting insert 28 in the insert pocket 24.

Clearly, by transferring the sliding movement of the cutting insert 28 from the sliding contact between the main body portion 56 of the cutting insert 28 and the generally rectangular slot 72 portion of the insert pocket 24 to the sliding contact of the guide member 54 within the guide groove 74, the wedging constraint is decoupled from the geometry of the main body portion 56 of the cutting insert 28, thus enabling the design of a compact "double-ended" cutting insert. Moreover, by transferring the sliding movement of the cutting insert 28 to the sliding of the guide member 54 within the guide groove 74, neither the sidewalls 84 of the insert pocket 24 nor the side surfaces 50 of the cutting insert 28 have to be manufactured with high accuracy, since they do not play an essential role in the sliding movement of the cutting insert 28.

Since sliding movement of the cutting insert 28 is carried out by the sliding of the guide member 54 within the guide groove 74, there is a designed clearance between the insert pocket sidewalls 84 and the cutting insert side surfaces 50 ensuring that there will be no contact between these surfaces. Any contact between these surfaces could lead to wedging of the insert in the rectangular slot 72. There is also a designed clearance between the lower wall sections 86 of the insert pocket 24 and the bottom surface sections 52 of the cutting insert 28 and between the upper wall 80 of the insert pocket 24 and the major top surface section 46 of the cutting insert 28. There is also a designed clearance between the concave surface 90 of the guide groove 74 and the convex surface 60 of the guide member 54. The only designed contact during sliding movement is between the groove support surfaces 88 of the guide groove 74 and the abutment surfaces 58 of the guide member 54. However, due to cutting forces acting on the cutting edges 38 during the deburring of bores, or due to forces acting on the cutting insert 28 as the forward end 26 of the deburring tool 20 rotates and passes through a bore, there will be a certain amount of uncontrollable contact between the lower wall sections 86 of the insert pocket 24 and the bottom surface sections 52 of the cutting insert 28 and also between the upper wall 80 of the insert pocket 24 and the major top surface section 46 of the cutting insert 28. However, these forms of uncontrollable contact cannot give rise to wedging of the cutting insert 28 due to the favorable relative dimensions of the members involved in the above-described uncontrollable contact.

Figure 13:
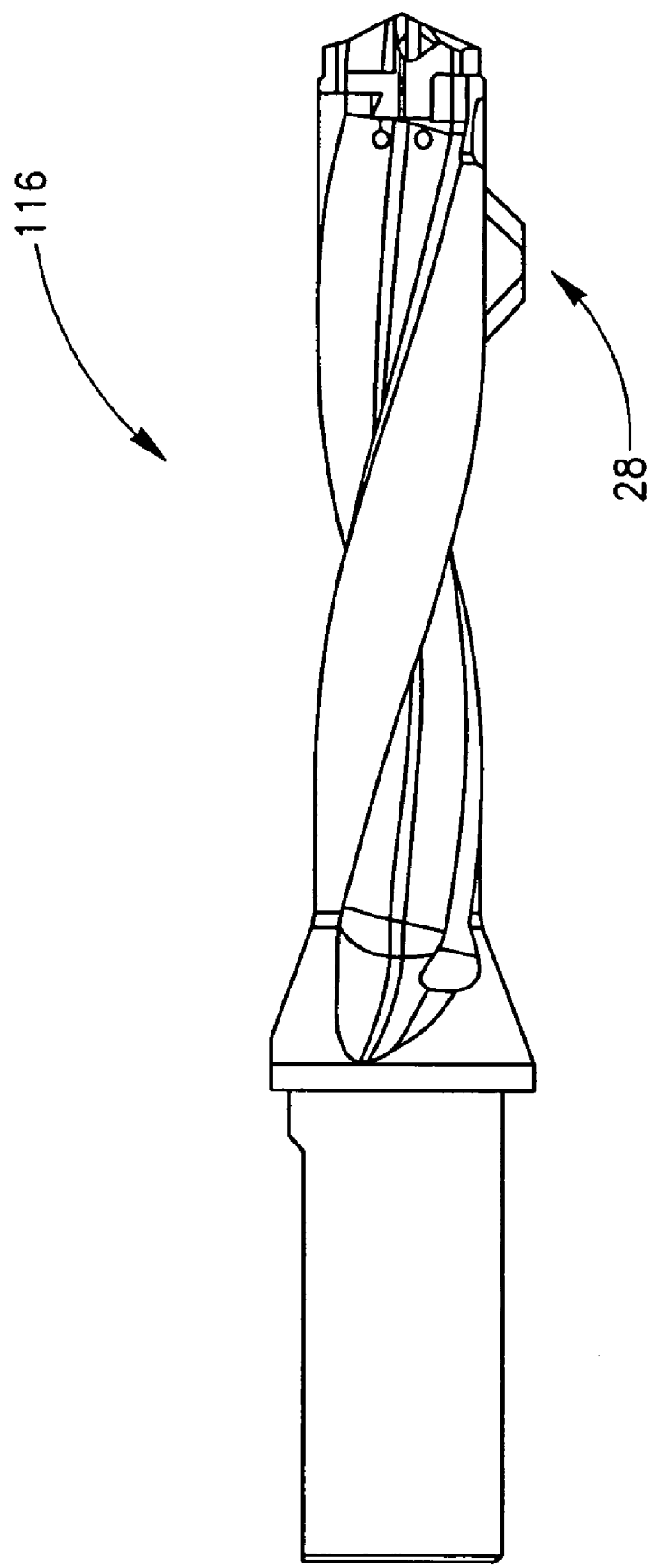
FIG. 13 is a drill combined with a deburring tool in accordance with the present invention.

It will be appreciated from FIGS. 2, 11 and 12 that the "deburring mechanism", of the deburring tool 20 of the present invention, that is, the cutting insert 28, spring 104 and first and second screws 102, 108 described hereinabove, is localized in a small region of the tool body 22. It will be clear to the skilled person that it is a simple matter of design to locate the "deburring mechanism" in any required tool body by forming the insert pocket 24, and minor and major bores 96, 92 in the tool body, in much the manner as in the deburring tool 20 described herein above. FIG. 13 shows a drill 116 in which the "deburring mechanism" of the present invention has been incorporated, showing the cutting insert 28 in the extended position.

Although the present invention has been described to a certain degree of particularity, it should be understood that various alterations and modifications could be made without departing from the scope of the invention as hereinafter claimed.

The invention claimed is:

1. An indexable cutting insert, comprising:
   a top surface, a bottom surface and a peripheral surface therebetween; and
   two identical opposing cutting portions, each cutting portion comprising two identical cutting edges, each cutting edge being located between a rake surface and a relief surface, the two cutting portions being reflection symmetric with respect to a major median plane of the cutting insert, the two identical cutting edges of each cutting portion being reflection symmetric with respect to a minor median plane of the cutting insert;
   the bottom surface comprising two bottom surface sections and a single guide member therebetween, the guide member comprising at least one ridge protruding beyond the bottom surface sections in a direction away from the top surface, the guide member having a longitudinal axis directed perpendicular to the major median plane.

2. The cutting insert according to claim 1, further comprising a through hole, passing between the top and bottom surfaces, the through hole dividing the guide member into two guide member portions, located on either side of the major median plane.

3. The cutting insert according to claim 1, further comprising a recess in the top surface.

4. The cutting insert according to claim 1, wherein the rake surface is located in the top surface and the relief surface is located in the peripheral surface of the cutting insert.

5. The cutting insert according to claim 1, wherein the two bottom surface sections are flat and coplanar.

6. The cutting insert according to claim 1, wherein the cutting insert is octagonally shaped in a top view of the cutting insert.

7. A deburring tool comprising:
   at one least cutting insert in accordance with claim 1; and
   a tool body having at least one insert pocket in which the at least one cutting insert is slidably retained, the at least one insert pocket opening out to a peripheral surface of the tool body via an aperture, the insert pocket comprising a slot and a guide groove with the guide member engaging the guide groove and the cutting insert located at least partially in the slot;
   the cutting insert being slidable between a retracted position and an extended position by means of a spring which biases the cutting insert towards the extended position, wherein in the extended position a given cutting portion protrudes from the aperture beyond the peripheral surface.

8. The deburring tool according to claim 7, wherein the spring is a compression spring.

9. The deburring tool according to claim 7, wherein the cutting insert is held in the extended position by a holding member.

10. The deburring tool according to claim 9, wherein in the extended position the holding member abuts a holding surface of the cutting insert.

11. The deburring tool according to claim 10, wherein the cutting insert further comprises a through hole, passing between the top and bottom surfaces, the through hole dividing the guide member into two guide member portions, located on either side of the major median plane.

12. The deburring tool according to claim 11, wherein the insert through hole has a hole-surface forming the holding surface of the cutting insert.

13. The deburring tool according to claim 10, wherein the cutting insert further comprises a recess in the top surface.

14. The deburring tool according to claim 13, wherein the holding surface is a portion of the recess in the top surface.

15. The deburring tool according to claim 7, wherein the cutting insert is octagonally shaped in a top view of the cutting insert.

16. The deburring tool according to claim 7, wherein the tool body of the deburring tool comprises a shank portion of a drill.

17. An indexable cutting insert, comprising:
   a top surface, a bottom surface and a peripheral surface therebetween;
   the peripheral surface comprising two opposing end surfaces and two opposing side surfaces;
   the bottom surface comprising two bottom surface sections and a single, centrally located guide member therebetween, the guide member protruding from the bottom surface sections in a direction away from the top surface, the guide member having a longitudinal axis that intersects the two opposing end surfaces, in a bottom view of the cutting insert;
   a first cutting portion comprising two identical cutting edges, one on either side of a first of said end surfaces; and
   a second cutting portion comprising two identical cutting edges, one on either side of a second of said end surfaces.

18. The cutting insert according to claim 17, further comprising a through hole, passing between the top and bottom surfaces, the through hole dividing the guide member into two guide member portions.

19. The cutting insert according to claim 17, further comprising a recess in the top surface.

20. The cutting insert according to claim 17 wherein the rake surface is located in the top surface and the relief surface is located in the peripheral surface of the cutting insert.

21. The cutting insert according to claim 17, wherein the two bottom surface sections are flat and coplanar.

22. The cutting insert according to claim 17, wherein the cutting insert is octagonally shaped in a top view of the cutting insert.

23. A deburring tool comprising:
a tool body having at least one insert pocket opening out to a peripheral surface of the tool body via an aperture, the insert pocket comprising a slot and a guide groove; and
an indexable cutting insert, comprising:
a top surface, a bottom surface and a peripheral surface therebetween;
the peripheral surface of the cutting insert comprising two opposing end surfaces and two opposing side surfaces;
the bottom surface comprising two bottom surface sections and a single, centrally located guide member therebetween, the guide member protruding from the bottom surface sections in a direction away from the top surface, the guide member having a longitudinal axis that intersects the two opposing end surfaces, in a bottom view of the cutting insert;
a first cutting portion comprising two identical cutting edges, one on either side of a first of said end surfaces; and
a second cutting portion comprising two identical cutting edges, one on either side of a second of said end surfaces;
wherein:
the cutting insert is located at least partially in the slot with the guide member engaging the guide groove, the cutting insert being slidable between a retracted position and an extended position by means of a spring which biases the cutting insert towards the extended position, wherein in the extended position one of said cutting portions protrudes from the aperture beyond the peripheral surface of the tool body.

24. The deburring tool according to claim 23, wherein the spring is a compression spring.

25. The deburring tool according to claim 23, wherein the cutting insert is held in the extended position by a holding member.

26. The deburring tool according to claim 25, wherein in the extended position the holding member abuts a holding surface of the cutting insert.

27. The deburring tool according to claim 26, wherein the cutting insert further comprises a through hole, passing between the top and bottom surfaces, the through hole dividing the guide member into two guide member portions, located on either side of the major median plane.

28. The deburring tool according to claim 27, wherein the insert through hole has a hole-surface forming the holding surface of the cutting insert.

29. The deburring tool according to claim 25, wherein the cutting insert further comprises a recess in the top surface.

30. The deburring tool according to claim 29, wherein the holding surface is a portion of the recess in the top surface.

31. The deburring tool according to claim 23, wherein the cutting insert is octagonally shaped in a top view of the cutting insert.

32. The deburring tool according to claim 23, wherein the tool body of the deburring tool comprises a shank portion of a drill.

* * * * *